US008165069B2

(12) United States Patent
Moon et al.

(10) Patent No.: US 8,165,069 B2
(45) Date of Patent: Apr. 24, 2012

(54) FAST UPLINK RANGING SYSTEM AND METHOD IN MOBILE COMMUNICATION SYSTEM

(75) Inventors: Young-Jin Moon, Daejeon (KR); Young-Il Kim, Daejeon (KR)

(73) Assignees: Samsung Electric Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 421 days.

(21) Appl. No.: 12/516,068

(22) PCT Filed: Jun. 25, 2007

(86) PCT No.: PCT/KR2007/003073
§ 371 (c)(1),
(2), (4) Date: May 22, 2009

(87) PCT Pub. No.: WO2008/069389
PCT Pub. Date: Jun. 12, 2008

(65) Prior Publication Data
US 2010/0046431 A1 Feb. 25, 2010

(30) Foreign Application Priority Data
Dec. 4, 2006 (KR) .................. 10-2006-0121421

(51) Int. Cl.
*H04W 4/00* (2009.01)
*H04J 11/00* (2006.01)
(52) U.S. Cl. ........................................ 370/328; 370/203
(58) Field of Classification Search .................. 370/328, 370/329, 330, 203, 206, 210
See application file for complete search history.

(56) References Cited

U.S. PATENT DOCUMENTS

| 7,359,366 | B2 | 4/2008 | Lee et al. |
| 7,515,641 | B2 | 4/2009 | Yu et al. |
| 2005/0117539 | A1 | 6/2005 | Song et al. |
| 2005/0141474 | A1 | 6/2005 | Lee et al. |
| 2006/0022873 | A1* | 2/2006 | Zimmerman ............ 342/464 |

(Continued)

FOREIGN PATENT DOCUMENTS

KR 10-2005-0063421 A 6/2005

(Continued)

OTHER PUBLICATIONS

Lee, Doo Hwan, OFDMA Uplink Ranging for IEEE 802.16e Using Modified Generalized Chirp-Like Polyphase Sequences, Sep. 26, 2005.

*Primary Examiner* — Brian Nguyen
(74) *Attorney, Agent, or Firm* — Jefferson IP Law, LLP

(57) ABSTRACT

The present invention relates to a fast uplink ranging system and method in a mobile communication system. According to the present invention, a fast uplink ranging system transmits two pairs of ranging codes having the same value at locations spaced by half of FFT pointers. The fast uplink ranging system calculates a correlation value using the received two pairs of ranging codes. An order in which complex exponential twiddle factors for removing complex exponential terms corresponding to a time delay are searched is determined using the correlation value. Therefore, it is possible to reduce a time required for searching a timing error of a terminal using non-periodic symmetry of complex exponential twiddle factors corresponding to the timing error, compared with a known method of searching a complex exponential twiddle factor.

19 Claims, 7 Drawing Sheets

U.S. PATENT DOCUMENTS

| | | | |
|---|---|---|---|
| 2006/0083160 A1 | 4/2006 | Koo et al. | |
| 2006/0203712 A1* | 9/2006 | Lim et al. | 370/208 |
| 2007/0060180 A1* | 3/2007 | Muharemovic et al. | 455/509 |
| 2007/0104177 A1* | 5/2007 | Hwang et al. | 370/348 |
| 2007/0298761 A1* | 12/2007 | Bani Hani | 455/404.2 |
| 2008/0170632 A1* | 7/2008 | Sohn et al. | 375/260 |

FOREIGN PATENT DOCUMENTS

| | | |
|---|---|---|
| KR | 10-0521135 B1 | 10/2005 |
| KR | 10-0534412 B1 | 12/2005 |
| KR | 10-2006-0033605 A | 4/2006 |

* cited by examiner

[Fig. 1]
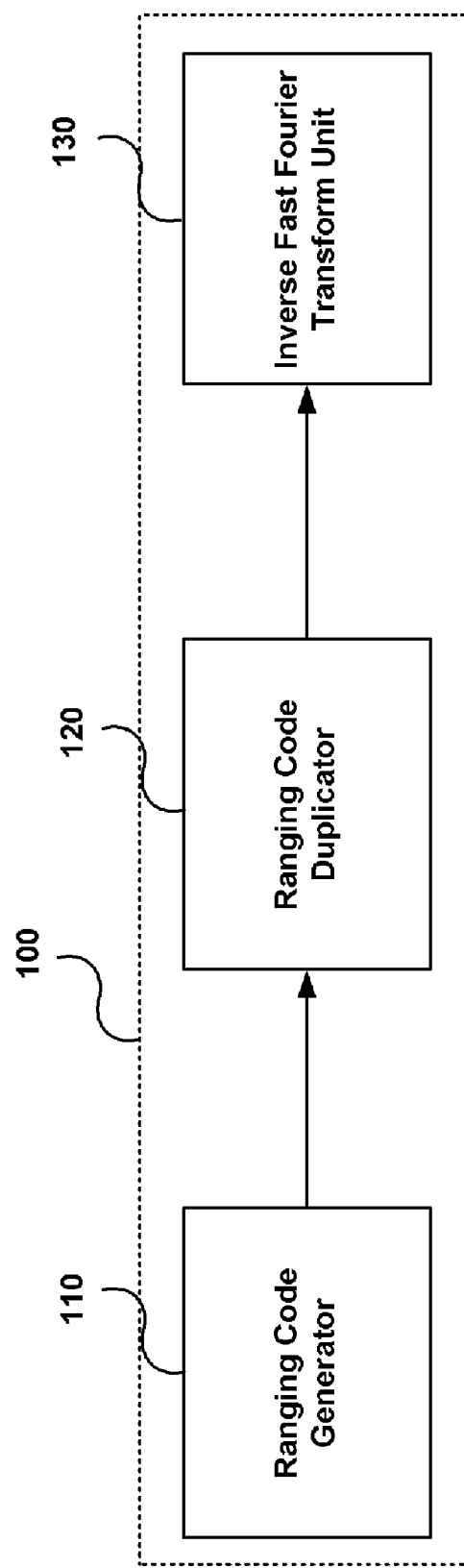

[Fig. 2]
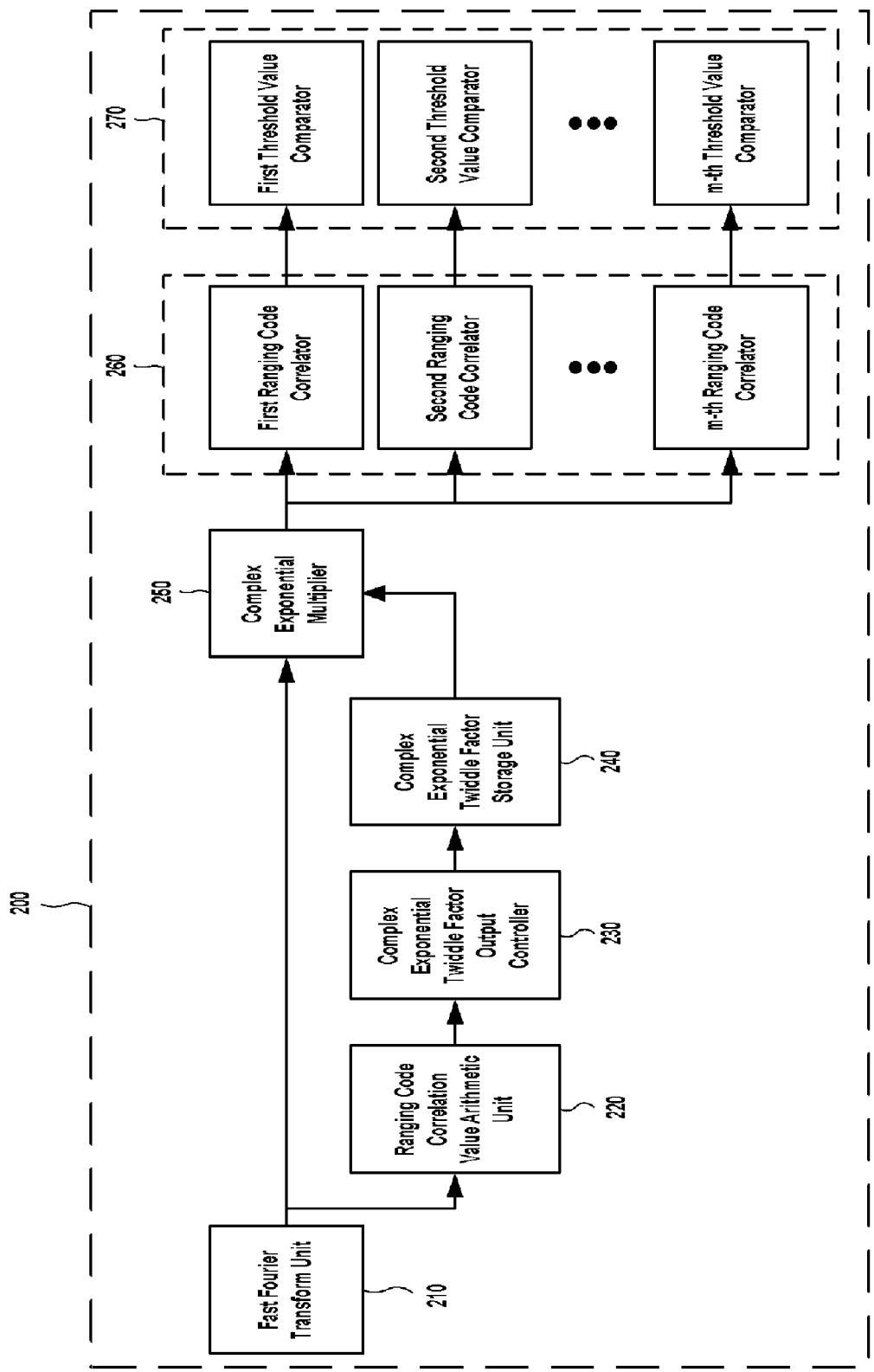

[Fig. 3]
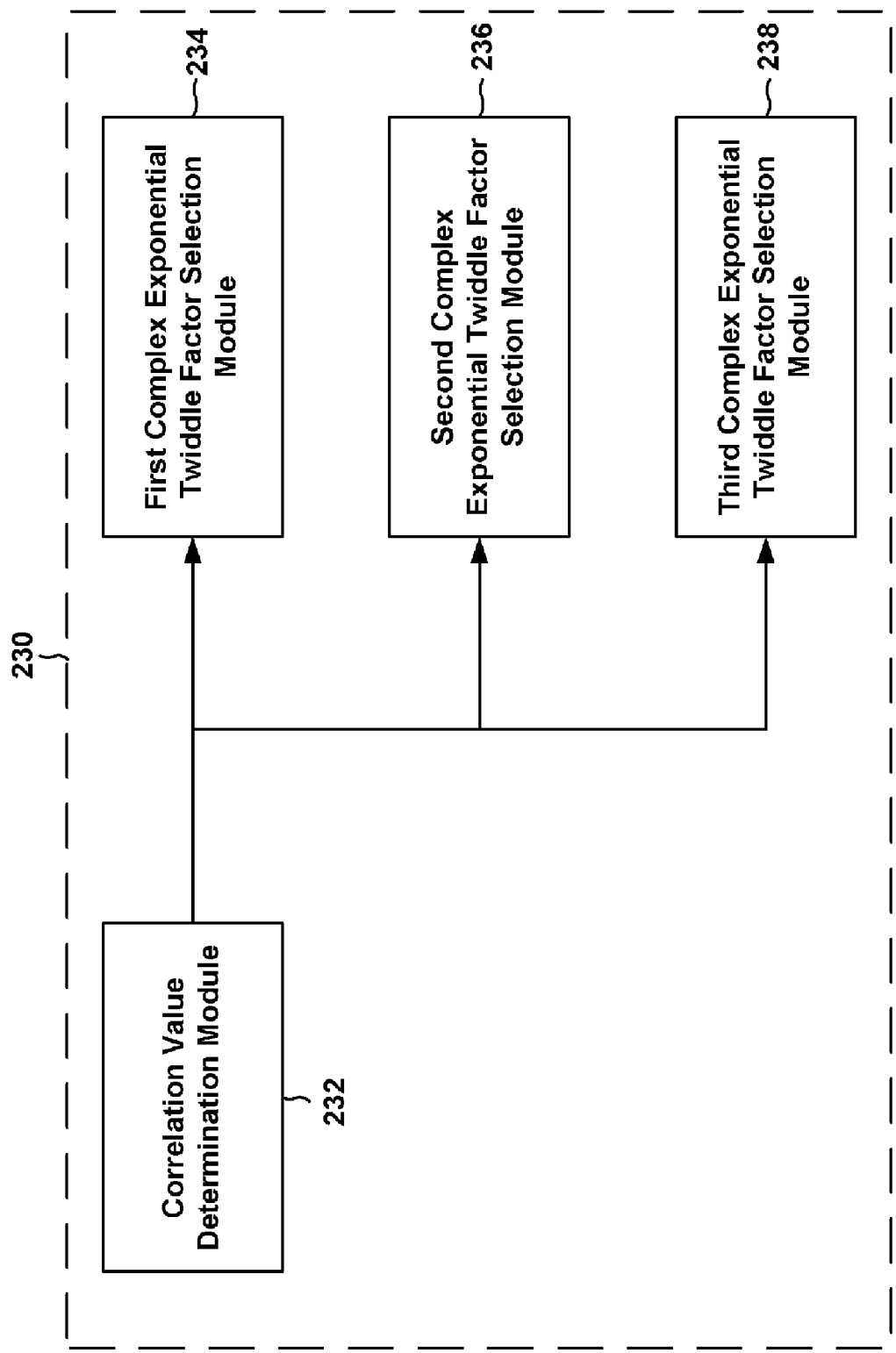

[Fig. 4]
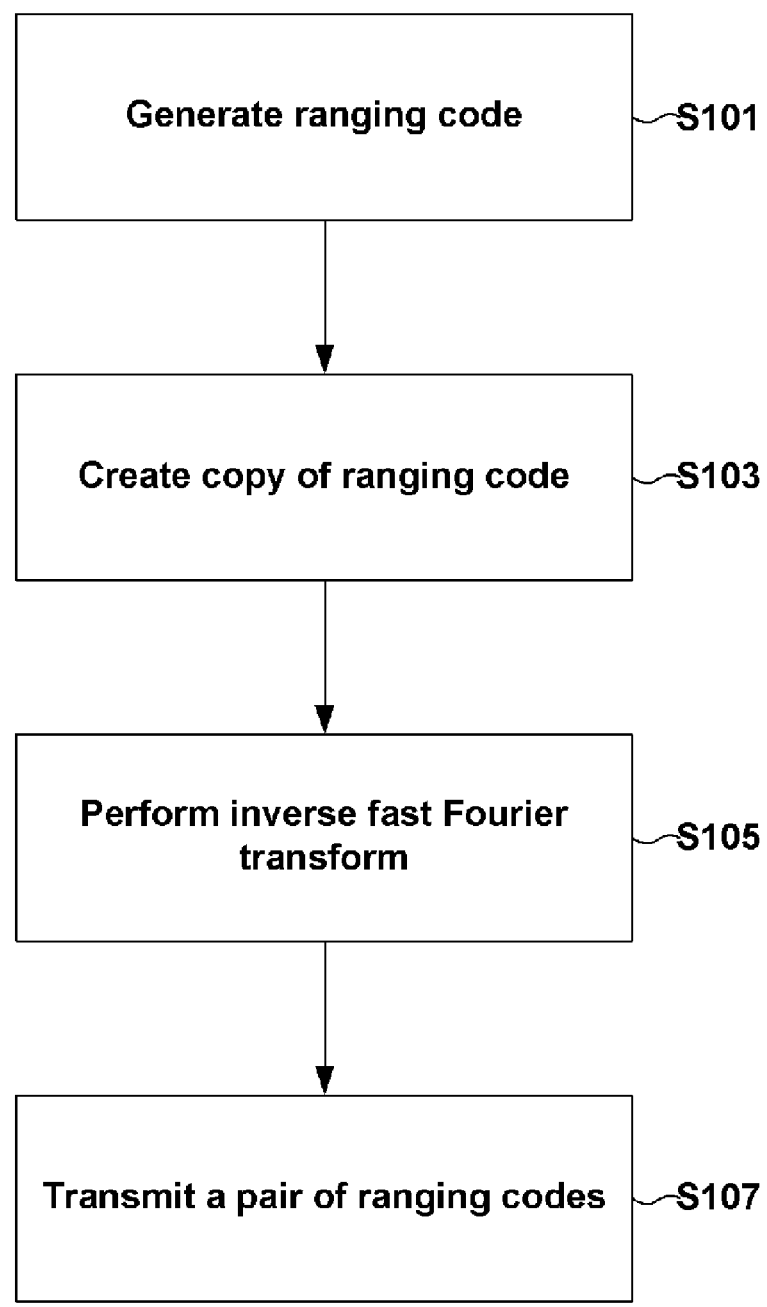

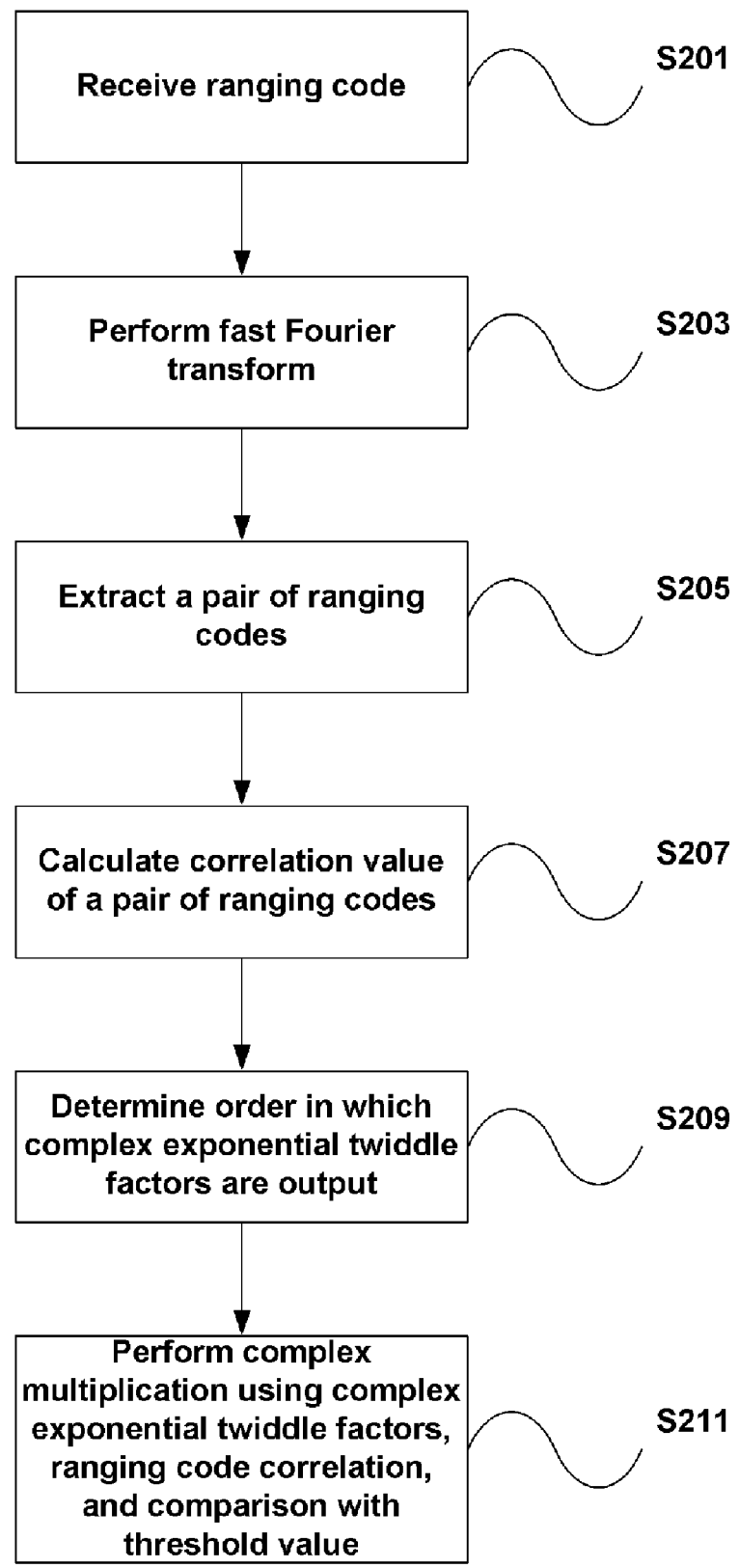

[Fig. 6]
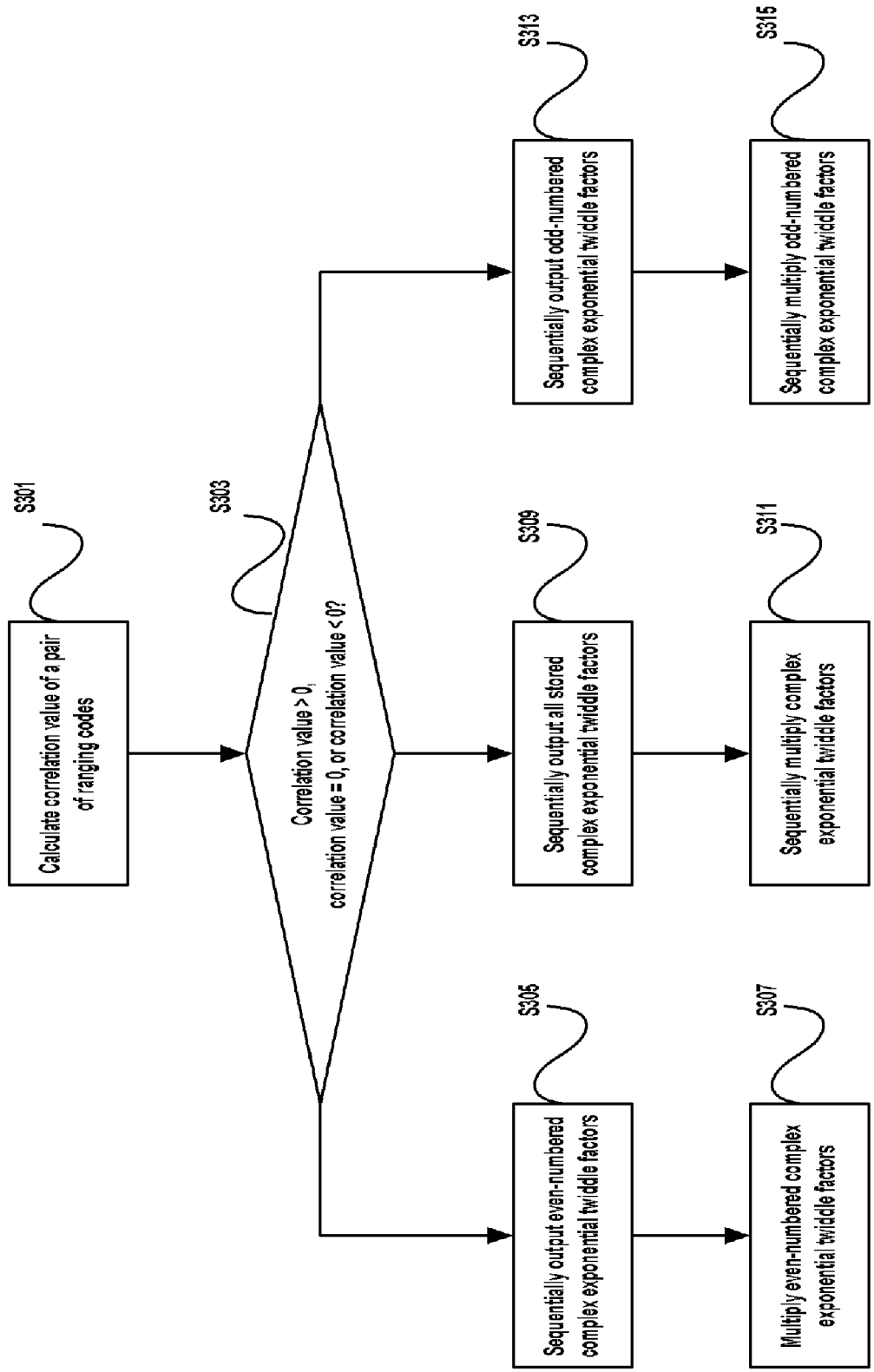

[Fig. 7]
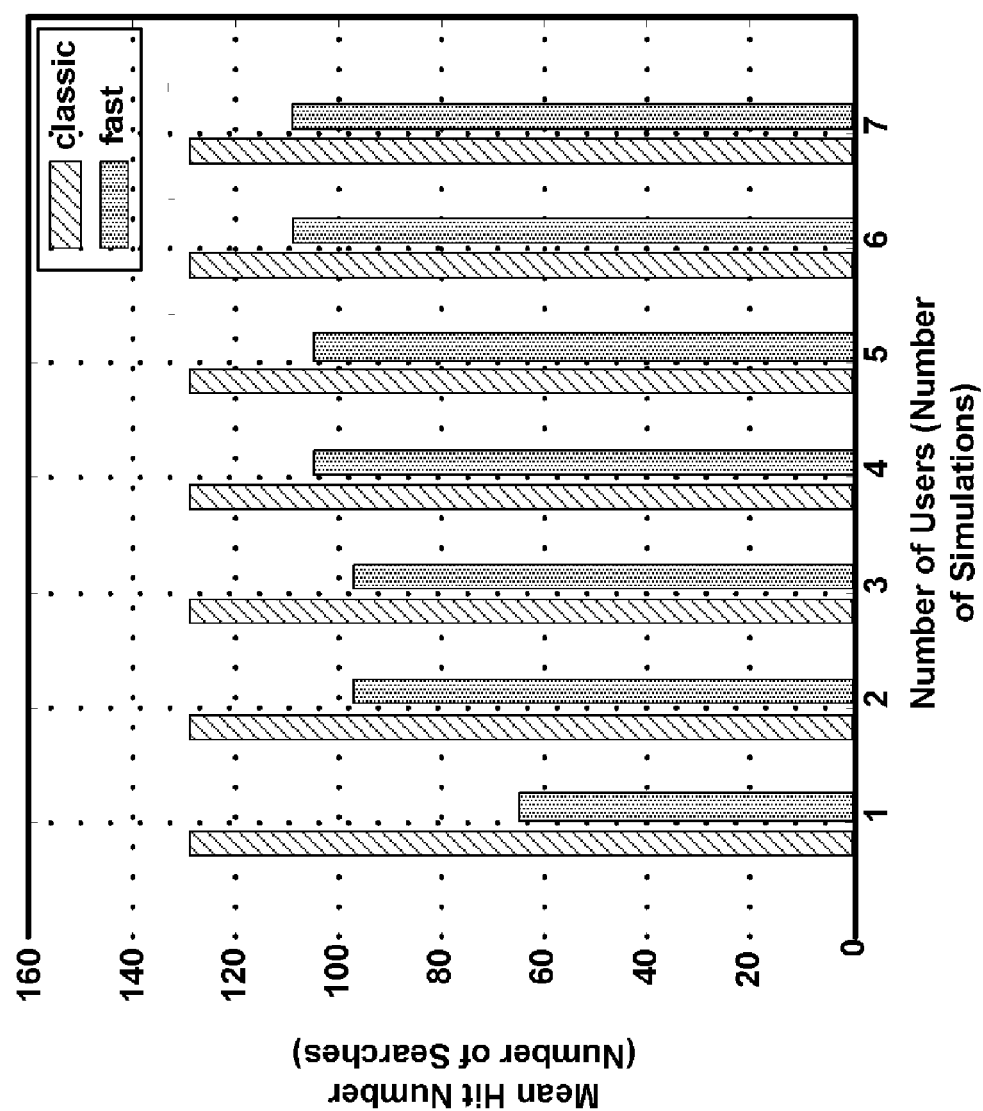

FAST UPLINK RANGING SYSTEM AND METHOD IN MOBILE COMMUNICATION SYSTEM

TECHNICAL FIELD

The present invention relates to a fast uplink ranging system and method in a mobile communication system. More particularly, the present invention relates to a technology for processing an uplink ranging channel fast in an OFDMA (Orthogonal Frequency Division Multiplexing Access)/TDD (Time Division Duplex) scheme mobile communication system.

BACKGROUND ART

In an OFDMA/TDD scheme, a fast data signal is converted into a slow data signal and data is transmitted/received through a subchannel having a plurality of subcarriers.

Generally, a downlink refers to a scheme in which a signal is transmitted from one base station to a plurality of users. In this case, data signals from the users are allocated to a plurality of subchannels and then transmitted to a downlink.

At this time, if the individual user terminals receive the data signals transmitted from one base station, all of the subcarriers in one OFDM symbol simultaneously reach the terminal receivers with no time delay, thereby maintaining orthogonality among the subcarriers.

However, in an uplink, due to a temporal difference and a positional difference between the terminals, absolute time synchronization is not achieved among the data signals from the terminals that reach the base station.

If the absolute time synchronization is not achieved among the terminals, in one OFDM symbol having the subchannels from a plurality of terminals, signal orthogonality among the subcarriers constituting each subchannel may be lost, resulting in a loss of an original signal upon data demodulation in the base station.

To overcome this problem, the base station measures time delays from a base station reference time in respect to the individual signals transmitted from the terminals and adjusts terminal transmission time on the basis of the base station reference time. Then, the time delays due to the temporal difference and the positional difference between the terminals are equalized.

For the measurement of an uplink time delay between an individual terminal and the base station, the corresponding terminal generates a pseudo-random ranging code, then performs BPSK (Binary Phase Shift Keying) modulation, and subsequently transmits the modulated ranging code to the base station through an allocated ranging channel.

At this time, the ranging codes transmitted from a plurality of terminals through the ranging channels are transmitted to the base station with separate random code characteristics.

Further, the individual signals received by the base station through a radio channel have a separate time delay due to the positional difference between the terminals and a difference in wireless channel environment. In the base station, a signal corresponding to the time delay is represented in a complex exponential form, and the phase thereof is modulated with respect to the original signal.

Accordingly, the base station first sequentially multiplies all possible complex exponential values, which removes the timing error represented in the complex exponential form, to find a timing error with respect to the base station reference time, and removes the timing error. Next, the base station performs a process of calculating the correlation values of all possible pseudo-random ranging codes and comparing the calculated correlation values with a threshold value, thereby finding the timing error of each terminal with respect to the base station reference time and a corresponding ranging code.

When the complex exponential term is sequentially multiplied to find a complex exponential value corresponding to a correct timing error, the number of complex exponential searches may become excessively large. As a result, the system requirements for fast ranging response are not met.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a fast uplink ranging system and method in a mobile communication system, having advantages of improving a timing error search time of a terminal in a base station.

Technical Solution

An exemplary embodiment of the present invention provides a fast uplink ranging system that transmits an uplink ranging signal in a mobile communication system.

The fast uplink ranging system includes a ranging code generator that generates a ranging code, a ranging code duplicator that creates a copy of the generated ranging code at a pointer location that is different from a pointer location at which the generated ranging code is allocated, and an inverse fast Fourier transform (IFFT) unit that performs inverse fast Fourier transform (IFFT) on the generated ranging code and the duplicated ranging code, and outputs a pair of ranging codes.

Another embodiment of the present invention provides a fast uplink ranging system that receives an uplink ranging signal in a mobile communication system.

The fast uplink ranging system includes a complex exponential twiddle factor storage unit that stores complex exponential twiddle factors corresponding to a time delay, a ranging code correlation value arithmetic unit that calculates a correlation value of a first ranging code and a second ranging code extracted from a received ranging signal to have the same ranging code value and to be allocated at different pointer locations, and a complex exponential twiddle factor output controller that determines an order in which the complex exponential twiddle factors are output using the correlation value according to a prediction result based on whether the time delay is even-numbered or odd-numbered. The complex exponential twiddle factor storage unit outputs the complex exponential twiddle factors according to the order determined by the complex exponential twiddle factor output controller.

Still another embodiment of the present invention provides a fast uplink ranging method that transmits an uplink ranging signal in a mobile communication system.

The fast uplink ranging method includes generating a ranging code, creating a copy of the generated ranging code at a pointer location that is different from a pointer location at which the generated ranging code is allocated, and performing inverse fast Fourier transform (IFFT) on the generated ranging code and the duplicated ranging code and outputting a pair of ranging codes.

Yet another embodiment of the present invention provides a fast uplink ranging method that receives an uplink ranging signal in a mobile communication system.

The fast uplink ranging method includes calculating a correlation value of a first ranging code and a second ranging code extracted from a received ranging signal to have the same ranging code value and to be allocated at different pointer locations, predicting whether a time delay is even-numbered or odd-numbered using the correlation value, and outputting complex exponential twiddle factors corresponding to the prediction result in the predicting among the complex exponential twiddle factors corresponding to the time delay.

Advantageous Effects

According to the exemplary embodiment of the present invention, it is possible to reduce the time required for searching the time delay error of each terminal using the non-periodic symmetry of the complex exponential twiddle factors corresponding to the time delay error.

BRIEF DESCRIPTION OF THE DRAWINGS

FIG. 1 is a block diagram of a fast uplink ranging system according to an exemplary embodiment of the present invention that transmits a fast uplink ranging signal in a mobile communication system.

FIG. 2 is a block diagram of a fast uplink ranging system according to an exemplary embodiment of the present invention that receives a fast uplink ranging signal in a mobile communication system.

FIG. 3 is a block diagram showing the detailed configuration of a complex exponential twiddle factor output controller 230 shown in FIG. 2.

FIG. 4 is a diagram showing a ranging method according to an exemplary embodiment of the present invention that transmits a fast uplink ranging signal in a mobile communication system.

FIG. 5 is a diagram showing a ranging method according to an exemplary embodiment of the present invention that receives a fast uplink ranging signal in a mobile communication system.

FIG. 6 is a detailed view showing Steps S207, S209, and S211 shown in FIG. 5.

FIG. 7 is a diagram showing a simulation result when a fast uplink ranging method according to an exemplary embodiment of the present invention is applied in a mobile communication system.

BEST MODE FOR CARRYING OUT THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises", "comprising", "includes", and "including", when used herein, specify the presence of constituent elements, but do not preclude the presence or addition of other constituent elements.

The term "module" used herein means a unit that processes a specific function or operation. The module can be implemented by hardware, software, or a combination thereof.

A fast uplink ranging system and method in a mobile communication system according to an exemplary embodiment of the present invention will now be described in detail with reference to the drawings.

FIG. 1 is a block diagram of a fast uplink ranging system according to an exemplary embodiment of the present invention that transmits a fast uplink ranging signal in a mobile communication system.

Referring to FIG. 1, a fast uplink ranging system 100 includes a ranging code generator 110, a ranging code duplicator 120, and an inverse fast Fourier transform (IFFT) unit 130.

Here, the fast uplink ranging system 100 that transmits the fast uplink ranging signal corresponds to a terminal in a mobile communication system.

The ranging code generator 110 generates a ranging code for transmitting an uplink ranging signal. At this time, a pseudo-random code having a 144-bit length corresponding to a WiBro ranging code length is generated, and the ranging code is subjected to BPSK (Binary Phase Shift Keying) modulation.

The ranging code duplicator 120 creates a copy of the ranging code generated by the ranging code generator 110 at a pointer location that is different from a pointer location at which the ranging code generated by the ranging code generator 110 is allocated. That is, an identical copy of the ranging code is created at a location spaced by 512 pointers, which is half of 1024 IFFT pointers corresponding to the number of subcarriers in a symbol of a WiBro system.

By duplicating the ranging code in this manner, a pair of generated ranging codes of an i-th terminal are represented by Equation 1.

$$P_i(k) = [X_i(k), X_i(k+1), \ldots, X_i(k+143)] \quad \text{(Equation 1)}$$
$$= P_i(k+512)$$
$$= [X_i(k+512), \ldots, X_i(k+143+512)]$$

At this time, it is assumed that $P_i(k)$ is a first ranging code generated by the ranging code generator 110, and $P_i(k+512)$ is a second ranging code duplicated by the ranging code duplicator 120.

The inverse fast Fourier transform (IFFT) unit 130 receives the first ranging code and the second ranging code having the same ranging code value and performs inverse fast Fourier transform (IFFT) thereon.

Subsequently, a pair of ranging codes of the first ranging code and the second ranging code subjected to the inverse fast Fourier transform (IFFT) are subjected to radio frequency conversion and then transmitted as a ranging signal to the base station through a radio channel.

FIG. 2 is a block diagram of a fast uplink ranging system according to an exemplary embodiment of the present invention that receives a fast uplink ranging signal in a mobile communication system.

Referring to FIG. 2, a fast uplink ranging system 200 includes a fast Fourier transform (FFT) unit 210, a ranging code correlation value arithmetic unit 220, a complex exponential twiddle factor output controller 230, a complex exponential twiddle factor storage unit 240, a complex exponential multiplier 250, m ranging code correlators 260, and m threshold value comparators 270.

Here, the fast uplink ranging system 200 that receives the fast uplink ranging signal corresponds to the base station in the mobile communication system.

At this time, the base station receives, from a plurality of terminals, ranging signals that are added to pseudo-random ranging codes with a separate time delay in a wireless environment.

Here, the received signals can be represented by Equation 2 when only the separate time delay is considered while leaving the fading environment and additive white Gaussian noise (AWGN) of the radio channel out of consideration.

$$r(n) = s_i(n + \tau_i) + \sum_{i \neq j} s_j(n + \tau_j) \qquad \text{(Equation 2)}$$

At this time, r(n) denotes the received ranging signal, $s_i(n+t_i)$ denotes the ranging signal received from the i-th terminal, and $$\sum_{i \neq j} s_j(n + \tau_j)$$

denotes the sum of the ranging signals received from terminals other than the i-th terminal.

The fast Fourier transform (FFT) unit 210 performs fast Fourier transform (FFT) to demodulate the received ranging signals. At this time, the ranging signals subjected to the fast Fourier transform (FFT) have both the original ranging signals of the terminals and the phase modulation forms of the original signals due to the time delay. This is represented by Equation 3.

$$FFT(r(n)) = R(k) = S_i(k)e^{j\frac{2\pi k \tau_i}{1024}} + \sum_{i \neq j} S_j(k)e^{j\frac{2\pi k \tau_j}{1024}} \qquad \text{(Equation 3)}$$

In Equation 3, $$S_i(k)e^{j\frac{2\pi k \tau_i}{1024}},$$

which denotes the ranging signal received from the i-th terminal, has both the pseudo-random ranging code generated from the terminal and the phase modulation form due to the time delay.

The ranging code correlation value arithmetic unit 220 extracts a pair of ranging codes from the ranging signal that is output from the fast Fourier transform (FFT) unit 210. At this time, the pair of ranging codes includes the first ranging code and the second ranging code described with reference to FIG. 1.

The ranging code correlation value arithmetic unit 220 calculates a correlation value of the first ranging code and the second ranging code and predicts whether a complex exponential term corresponding to the time delay is even-numbered or odd-numbered.

For prediction, the ranging code correlation value arithmetic unit 220 compares the first ranging code and the second ranging code, which undergo the time delay, with each other.

Equation 4 represents the second ranging code of the i-th terminal that undergoes the time delay.

$$P_i(k+512)e^{j\frac{2\pi(k+512)\tau_i}{1024}} = P_i(k+512)e^{j\frac{2\pi k \tau_i}{1024}} e^{j\pi\tau_i} \qquad \text{(Equation 4)}$$

According to Equation 4, the second ranging code is divided to have two phase modulation terms.

At this time, according to the value 't$_i$', which is the time delay of the i-th terminal, the term '$e^{j\pi\tau_i}$' of the divided phase modulation terms becomes '1' in an even-numbered time delay or '−1' in an odd-numbered time delay.

The fast uplink ranging system 100 shown in FIG. 1 transmits the first ranging code and the second ranging code having the same value. However, according to Equation 4, the output values of the first ranging code and the second ranging code from the fast Fourier transform (EFT) unit 210 may be identical or different according to whether the time delay in the wireless environment is even-numbered or odd-numbered.

This is represented by Equation 5.

$$P_i(k)e^{j\frac{2\pi k \tau_i}{1024}} = P_i(k+512)e^{j\frac{2\pi k \tau_i}{1024}} : \tau_i \text{ is even} \qquad \text{(Equation 5)}$$
$$P_i(k)e^{j\frac{2\pi k \tau_i}{1024}} = -P_i(k+512)e^{j\frac{2\pi k \tau_i}{1024}} : \tau_i \text{ is odd}$$

That is, when the value 't$_i$', which is the time delay of the i-th terminal, is the even-numbered time delay, such as 0, 2, 4, or 8, the first ranging code and the second ranging code have the same value.

However, when the time delay is the odd-numbered time delay, such as 1, 3, 5, or 7, the first ranging code and the second ranging code have values that are inverted with respect to each other.

Accordingly, when the first ranging code and the second ranging code are identical, the ranging code correlation value arithmetic unit 220 outputs '1' as the correlation value. Further, if the first ranging code and the second ranging code have values that are inverted with respect to each other, the ranging code correlation value arithmetic unit 220 outputs '−1' as the correlation value. In addition, when the first ranging code and the second ranging code are not identical or do not have values that are inverted with respect to each other, the ranging code correlation value arithmetic unit 220 outputs '0' as the correlation value.

The complex exponential twiddle factor output controller 230 determines an order in which the complex exponential twiddle factors are output to the complex exponential multiplier 250 on the basis of the correlation value output from the ranging code correlation value arithmetic unit 220. That is, complex exponential twiddle factor output controller 230 predicts whether the time delay is even-numbered or odd-numbered according to the correlation value. Subsequently, according to the prediction result, it is determined whether to start a search from a value corresponding to an even-numbered complex exponential twiddle factor or from a value corresponding to an odd-numbered complex exponential twiddle factor. Then, it is determined that a time required for calculating the time delay error can be reduced.

Here, as shown in FIG. 3, the complex exponential twiddle factor output controller 230 can be implemented in detail.

Referring to FIG. 3, the complex exponential twiddle factor output controller 230 includes a correlation value determination module 232, a first complex exponential twiddle factor selection module 234, a second complex exponential twiddle factor selection module 236, and a third complex exponential twiddle factor selection module 238.

The correlation value determination module 232 determines whether the correlation value output from the ranging code correlation value arithmetic unit 220 is larger than, smaller than, or equal to 0 (zero).

When the correlation value determined by the correlation value determination module 232 is larger than 0, the first complex exponential twiddle factor selection module 234 outputs, to the complex exponential twiddle factor storage unit 240, a signal that controls the sequential output of complex exponential twiddle factors for removing the time delay corresponding to the even-numbered complex exponential term.

When the correlation value determined by the correlation value determination module 232 is equal to 0, the second complex exponential twiddle factor selection module 236 outputs, to the complex exponential twiddle factor storage unit 240, a signal that controls the sequential output of the complex exponential twiddle factors sequentially stored to remove the time delay.

When the correlation value determined by the correlation value determination module 232 is smaller than 0, the third complex exponential twiddle factor selection module 238 outputs, to the complex exponential twiddle factor storage unit 240, a signal that controls the sequential output of complex exponential twiddle factors for removing the time delay corresponding to the odd numbered complex exponential term.

The complex exponential twiddle factor storage unit 240 stores the complex exponential twiddle factor corresponding to the time delay.

The complex exponential twiddle factor storage unit 240 outputs the corresponding complex exponential twiddle factors under the control of the complex exponential twiddle factor output controller 230.

The complex exponential multiplier 250 performs complex multiplication of the complex exponential twiddle factors output from the complex exponential twiddle factor storage unit 240 and a set of all possible ranging codes.

The m ranging code correlators 260 search for corresponding ranging codes using the complex multiplication result from the complex exponential multiplier 250.

The m threshold value comparators 270 compare the ranging codes searched by the m ranging code correlators 260 with a threshold value, and search the complex exponential twiddle factors and the ranging codes when a ranging code exceeds the threshold value.

Subsequently, if the search process by the m threshold value comparators 270 is completed, the base station (or the fast uplink ranging system 200) informs the terminal of the time delay of the terminal and the ranging code, and ends the ranging process.

Now, a fast uplink ranging method in the mobile communication system will be described on the basis of the above-described configuration.

FIG. 4 is a diagram showing a ranging method according to an exemplary embodiment of the present invention that transmits a fast uplink ranging signal in a mobile communication system.

Referring to FIG. 4, first, the fast uplink ranging system 100 generates a ranging code (Step S101).

At Step S101, a copy of the generated ranging code is created. In this case, the copy of the generated ranging code is created at a pointer location that is different from a pointer location, at which the ranging code generated at Step S101 is allocated (Step S103). At this time, the copy of the ranging code generated at Step S101 is created at a location spaced by half of the IFFT pointers.

Next, the first ranging code generated at Step S101 and the second ranging code duplicated at Step S103 are subjected to the inverse fast Fourier transform (IFFT) (Step S105).

Next, a pair of ranging codes including the first ranging code and the second ranging code that are subjected to the inverse fast Fourier transform (IFFT) ranging code are transmitted (Step S107).

FIG. 5 is a diagram showing a ranging method according to an exemplary embodiment of the present invention that receives a fast uplink ranging signal in a mobile communication system.

Referring to FIG. 5, if the ranging signal is received (Step S201), the fast Fourier transform (FFT) is performed (Step S203).

Next, a pair of ranging codes are extracted from the ranging signal that is subjected to the fast Fourier transform (FFT) at Step S203 (Step S205). At this time, the pair of ranging codes are the same as described with reference to FIG. 4, and include the first ranging code and the second ranging code transmitted at Step S107.

Next, the correlation value between a pair of ranging codes extracted at Step S205, that is, the first ranging code and the second ranging code, is calculated (Step S207). Here, the correlation value calculation depends upon the calculation operation of the ranging code correlation value arithmetic unit 220 shown in FIG. 2.

Next, using the correlation value calculated at Step S207, an order in which the complex exponential twiddle factors stored in the complex exponential twiddle factor storage unit 240 are output is determined (Step S209).

Next, the complex multiplication of the complex exponential twiddle factors output according to the determination at Step S209 and the ranging signals output at Step S203, the ranging code correlation, and the comparison with the threshold value are performed (Step S211).

If the complex exponential twiddle factor and the ranging code exceeding the threshold value are output through Step S211, they are transmitted to the terminal.

FIG. 6 is a detailed view showing Steps S207, S209, and S211 shown in FIG. 5.

Referring to FIG. 6, the correlation value of a pair of ranging codes is calculated (Step S301), and then it is determined that the calculated correlation value is larger than, smaller than, or equal to 0 (zero) (Step S303).

As the determination result, if the correlation value is larger than 0, even-numbered complex exponential twiddle factors among the complex exponential twiddle factors stored in the complex exponential twiddle factor storage unit 240 are sequentially output (Step S305).

Next, using the even-numbered complex exponential twiddle factors output at Step S305, the multiplication of the even-numbered complex exponential twiddle factors is performed (Step S307).

Further, as the determination result, if the correlation value is equal to 0, all of the complex exponential twiddle factors stored in the complex exponential twiddle factor storage unit 240 are sequentially output (Step S309).

Next, using the complex exponential twiddle factors output at Step S309, the multiplication of the complex exponential twiddle factor is performed (Step S311).

In addition, as the determination result, if the correlation value is smaller than 0, odd-numbered complex exponential twiddle factors stored in the complex exponential twiddle factor storage unit 240 are sequentially output (Step S313).

Next, using the odd-numbered complex exponential twiddle factors output at Step S313, the multiplication of the complex exponential twiddle factors is performed (Step S315).

As described above, the terminal (or the fast uplink ranging system 100) transmits the copy of the ranging code at a location spaced by half of the FFT pointers. Accordingly, the base station (or the fast uplink ranging system 200) calculates the correlation value of two pairs of ranging codes and predicts whether the terminal time delay is odd-numbered or even-numbered. Therefore, it is possible to reduce a time required for searching the time delay error.

At this time, the amount of time required for searching the time delay error is reduced is represented through a simple numerical analysis.

Equation 6 represents a mean hit number of complex exponential twiddle factor searches that, when the i-th terminal undergoes a separate time delay, are performed by the base station in order to search the time delay of the i-th terminal.

$$E[\chi_{fast}] = M_{fast} = P_{correct} \times M_{correct} + P_{unknown} \times M_{unknown} + P_{incorrect} \times M_{incorrect} \quad \text{(Equation 6)}$$

That is, the mean timing error search time $E[\chi_{fast}]$ is identical to the mean hit number $(M_{fast})$ of complex exponential twiddle factor searches.

Here, the mean hit number $(M_{fast})$ of complex exponential twiddle factor searches is identical to the sum of the mean hit numbers of complex exponential twiddle factor searches when the time delay of the i-th terminal and the correlation value are identical, the correlation value is '0', and when the time delay of the i-th terminal and the correlation value are different.

At this time, $P_{correct} \times M_{correct}$ denotes the mean hit number of complex exponential twiddle factor searches when the time delay of the i-th terminal and the correlation value are identical.

Further, $P_{unknown} \times M_{unknown}$ denotes the mean hit number of complex exponential twiddle factor searches when the time delay of the i-th terminal is unknown and the correlation value is '0'. In addition, $P_{incorrect} \times M_{incorrect}$ denotes the mean hit number of complex exponential twiddle factor searches when the time delay of the i-th terminal and the correlation value are different.

Next, Equation 7 represents the mean hit numbers of complex exponential twiddle factor searches according to the correlation values.

$$M_{correct} = \frac{\sum_{1}^{\frac{D_{max}}{2}} x_{fast}}{\frac{D_{max}}{2}} \quad \text{(Equation 7)}$$

$$M_{unknown} = \frac{\sum_{1}^{D_{max}} x_{fast}}{D_{max}}$$

$$M_{incorrect} = \left( \frac{D_{max}}{2} + \frac{\sum_{1}^{\frac{D_{max}}{2}} x_{fast}}{\frac{D_{max}}{2}} \right)$$

Here, $\chi_{fast}$ denotes the timing error value of the terminal, and $D_{max}$ denotes the maximum timing error value.

Next, Equation 8 represents probability values according to the correlation values.

$$P_{incorrect} = P(U_{i-odd}, C_p > 0) + P(U_{i-even}, C_p < 0) \quad \text{(Equation 8)}$$

$$= 2 \times \left\{ \begin{array}{l} \frac{\sum_{k=0}^{floor[\frac{n-3}{2}]} P_k}{2^n} : n \geq 3 \\ 0 : n = 1, 2 \end{array} \right.$$

$$P_{unknown} = P(C_p = 0) = \left\{ \begin{array}{l} \frac{nP_{n/2}}{2} : n \text{ even} \\ 0 : n \text{ odd} \end{array} \right.$$

$$P_{correct} = P(U_{i-even}, C_p > 0) + P(U_{i-odd}, C_p < 0)$$
$$= 1 - P_{unknown} - P_{incorrect}$$

Here, $U_{i-even}$ represents a case where the timing error value of the i-th terminal is even, and $U_{i-odd}$ represents a case where the timing error value of the i-th terminal is odd. Further, $C_p \text{ floor}\left[\frac{n-3}{2}\right]$ denotes an integer that is not larger than (n−3)/2.

FIG. 7 is a diagram showing a simulation result when a fast uplink ranging method according to an exemplary embodiment of the present invention is applied in a mobile communication system.

FIG. 7 shows a comparison result of the mean hit number of complex exponential twiddle factor searches calculated using Equation 6, Equation 7, and Equation 8, and the mean hit number of complex exponential twiddle factor searches calculated by the existing method.

In the graph shown in FIG. 7, which shows the comparison of the mean search numbers, the horizontal axis represents the number of simulations (Number of Users), and the vertical axis represents the mean hit number of complex exponential twiddle factor searches.

At this time, bars corresponding to 'classic' depend upon the existing method, and bars corresponding to 'fast' depend upon a method according to an exemplary embodiment of the present invention.

The exemplary embodiment of the present invention described above is not be implemented by only the method and apparatus, but it may be implemented by a program for executing the functions corresponding to the configuration of the exemplary embodiment of the present invention or a recording medium having the program recorded thereon. These implementations can be realized by the ordinarily skilled person in the art from the description of the above-described exemplary embodiment.

It is to be understood that the invention is not limited to the disclosed embodiments, but, on the contrary, is intended to cover various modifications and equivalent arrangements included within the spirit and scope of the appended claims.

The invention claimed is:

1. A fast uplink ranging system that transmits an uplink ranging signal in a mobile communication system, the fast uplink ranging system comprising:
 a ranging code generator that generates a ranging code;
 a ranging code duplicator that creates a copy of the generated ranging code at a pointer location that is different from a pointer location at which the generated ranging code is allocated; and
 an inverse fast Fourier transform (IFFT) unit that performs IFFT on the generated ranging code and the duplicated ranging code, and outputs a pair of ranging codes.

2. The fast uplink ranging system of claim 1, wherein the ranging code duplicator creates the copy of the generated ranging code at a pointer location spaced from a pointer location, at which the generated ranging code is allocated, by half of a plurality of IFFT pointers corresponding to the number of subcarriers in a symbol.

3. A fast uplink ranging system that receives an uplink ranging signal in a mobile communication system, the fast uplink ranging system comprising:
 a complex exponential twiddle factor storage unit that stores complex exponential twiddle factors corresponding to a time delay;
 a ranging code correlation value arithmetic unit that calculates a correlation value of a first ranging code and a second ranging code extracted from a received ranging signal to have a same ranging code value and to be allocated at different pointer locations; and
 a complex exponential twiddle factor output controller that determines an order in which the complex exponential twiddle factors are output using the correlation value according to a prediction result on whether the time delay is even-numbered or odd-numbered,
 wherein the complex exponential twiddle factor storage unit outputs the complex exponential twiddle factors according to the order determined by the complex exponential twiddle factor output controller.

4. The fast uplink ranging system of claim 3, wherein the complex exponential twiddle factor output controller includes:
 a correlation value determination module that determines whether the correlation value is larger than, smaller than, or equal to 0 (zero);
 a first complex exponential twiddle factor selection module that, if it is determined that the correlation value is larger than 0, predicts the time delay as even-numbered, and determines to successively output even-numbered complex exponential twiddle factors;
 a second complex exponential twiddle factor selection module that, if it is determined that the correlation value is 0, predicts the time delay as unknown (neither even-numbered nor odd-numbered), and determines to successively output the complex exponential twiddle factors stored in the complex exponential twiddle factor storage unit; and
 a third complex exponential twiddle factor selection module that, if it is determined that the correlation value is smaller than 0, predicts the time delay as an odd-numbered delay, and determines to successively output odd-numbered complex exponential twiddle factors.

5. The fast uplink ranging system of claim 4, wherein the ranging code correlation value arithmetic unit outputs, as the correlation value, '1' when the time delay is even-numbered, '−1' when the time delay is odd-numbered, and '0' when the time delay is unknown (neither even-numbered nor odd-numbered).

6. The fast uplink ranging system of claim 3, wherein the pointer locations at which the first ranging code and the second ranging code are allocated are spaced by half of a plurality of fast Fourier transform (FFT) pointers corresponding to the number of subcarriers in a symbol.

7. A fast uplink ranging method that transmits an uplink ranging signal in a mobile communication system, the fast uplink ranging method comprising:
 generating, by a ranging code generator, a ranging code;
 creating, by a range code duplicator, a copy of the generated ranging code at a pointer location that is different from a pointer location at which the generated ranging code is allocated; and
 performing, by a fast Fourier transform (IFFT) unit, an IFFT on the generated ranging code and a duplicated ranging code, and outputting a pair of ranging codes.

8. The fast uplink ranging method of claim 7, wherein the creating of the copy of the generated ranging code creates the copy of the generated ranging code so as to be spaced from a pointer location, at which the generated ranging code is allocated, by half of a plurality of IFFT pointers corresponding to the number of subcarriers in a symbol.

9. A fast uplink ranging method that receives an uplink ranging signal in a mobile communication system, the fast uplink ranging method comprising:
 calculating a correlation value of a first ranging code and a second ranging code extracted from a received ranging signal to have a same ranging code value and to be allocated at different pointer locations;
 predicting using the correlation value whether a time delay is even-numbered or odd-numbered; and
 outputting complex exponential twiddle factors corresponding to a prediction result in the predicting among complex exponential twiddle factors corresponding to the time delay.

10. The fast uplink ranging method of claim 9, wherein the predicting includes:

determining whether the correlation value is larger than, smaller than, or equal to 0 (zero);

if it is determined that the correlation value is larger than 0, predicting the time delay as even-numbered;

if it is determined that the correlation value is equal to 0, predicting the time delay as unknown (neither even-numbered nor odd-numbered); and if it is determined that the correlation value is smaller than 0, predicting the time delay as odd-numbered.

11. The fast uplink ranging method of claim 10, wherein the outputting of the complex exponential twiddle factors includes:

if a prediction result that the time delay is even-numbered is output, outputting even-numbered complex exponential twiddle factors;

if the prediction result that the time delay is unknown (neither even-numbered nor odd-numbered) is output, sequentially outputting complex exponential twiddle factors; and if the prediction result that the time delay is odd-numbered is output, outputting odd-numbered complex exponential twiddle factors.

12. The fast uplink ranging method of claim 11, wherein, when the even-numbered complex exponential factors are outputted, performing a multiplication of the even-numbered complex exponential twiddle factors.

13. The fast uplink ranging method of claim 11, wherein, when the complex exponential twiddle factors are outputted, performing a multiplication of the complex exponential twiddle factors.

14. The fast uplink ranging method of claim 11, wherein, when the odd-numbered complex exponential factors are outputted, performing a multiplication of the odd-numbered complex exponential twiddle factors.

15. The fast uplink ranging method of claim 9, wherein the calculating of the correlation value calculates, as the correlation value,1 11 when the time delay is even-numbered, 1-11 when the time delay is odd-numbered, and 101 when the time delay is unknown (neither even-numbered nor odd-numbered).

16. The fast uplink ranging method of claim 9, wherein the pointer locations at which the first ranging code and the second ranging code are allocated respectively, are spaced by half of the fast Fourier transform (FFT) pointers corresponding to the number of subcarriers in a symbol.

17. The fast uplink ranging method of claim 9, further comprising determining an order in which the complex exponential twiddle factors are output.

18. The fast uplink ranging method according to claim 9, further comprising performing a multiplication of the complex exponential twiddle factors and the correlation value of the first ranging code and the second ranging code, and comparing a result of the multiplication with a threshold value.

19. The fast uplink ranging method of claim 18, wherein, when the result of the multiplication exceed the threshold value, transmitting the result and the threshold value to a terminal.

\* \* \* \* \*